Patented Oct. 13, 1925.

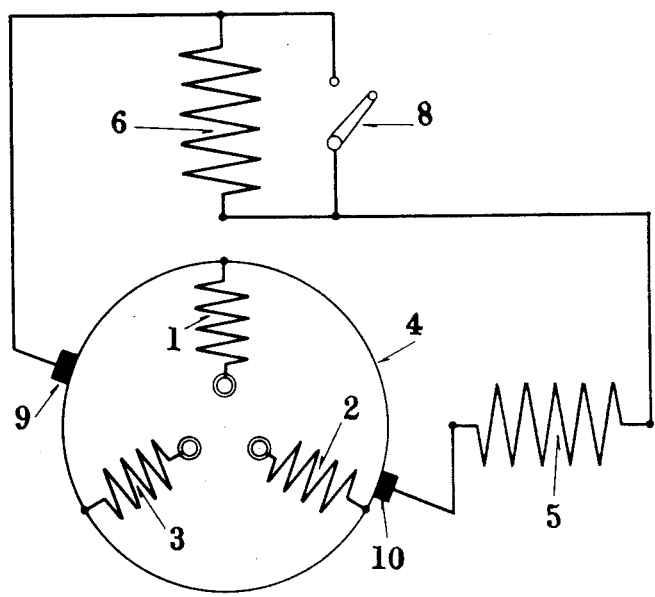

1,557,124

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed October 20, 1924. Serial No. 744,552.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to self-excited synchronous induction motors of the type in which the unidirectional exciting winding is displaced from that axis of the machine which is 90 electrical degrees from the brush axis. The object of the invention is to provide simple and convenient means for starting such machines.

My invention is applicable to single as well as polyphase motors and in the single view of the accompanying drawings I have illustrated a polyphase machine. The rotor and stator members are constructed without defined polar projections and in the machine illustrated the rotor is the inducing member, being provided with polyphase windings 1, 2 and 3, supplied with current through slip rings, and with commuted winding 4 interconnected with the polyphase winding as shown. The stator or induced member is provided with exciting winding 5, preferably displaced by a small angle from the axis of the brushes, and with a second winding 6, preferably displaced 90 electrical degrees from the exciting winding. Windings 5 and 6 are connected to the brushes in series and in circuit with the brushes 9—10, and switch 8 and connections are provided for short-circuiting winding 6 when suitable speed has been attained.

Referring to the operation of the machine described, the line is connected with the slip rings, switch 8 being open. The revolving field set up in the rotor induces voltages in the windings 5 and 6, which are phase displaced from each other. The windings 5 and 6 are connected in series and therefore the total voltage acting on the circuit is less than the arithmetical sum of the individual voltages induced in windings 5 and 6. The current flow in the windings 5 and 6 is consequently less than the value which would exist if each winding were short-circuited on itself, and thus the circuit arrangement described results in the starting current being kept within a suitable limit without the use of external resistances. As the speed increases the induction motor torque decreases and would become zero at about fifty per cent synchronous speed if windings 5 and 6 remained in the starting relation. For this reason switch 8 must be closed at about fifty per cent normal speed thereby transforming the action of the secondary windings 5 and 6 from the single phase action into a polyphase action and consequently producing a powerful torque to bring the machine nearly up to synchronous speed as an induction motor. When synchronous speed is approximately attained the winding 5, as the result of the voltage impressed thereon from the brushes 9 and 10, produces a powerful synchronizing torque and brings the rotor into synchronism. The smaller the angular displacement of the winding 5 from the brushes, the stronger will be the synchronizing torque, and I prefer to let this angular displacement be less than 45 electrical degrees whereby is secured a satisfactory synchronizing torque while retaining the winding in such position that one component of its magnetization is so located as to satisfactorily influence the power factor of the machine during normal operation.

Having fully described my invention, what I claim as new and desire to secure by Letters Patent of the United States is:

1. In a synchronous induction motor, the combination of an inducing member provided with a commutator and brushes thereon, an induced member having an exciting winding and a starting winding displaced therefrom, said windings of the induced member being connected to the brushes in series, and means for short-circuiting the second winding when suitable speed has been attained.

2. In a synchronous induction motor, the combination of an inducing member provided with a commutator and brushes thereon, an induced member having an exciting winding displaced from that axis of the machine which is at right angles to the brush axis and a starting winding displaced from the exciting winding, said windings of the induced member being connected to the brushes in series, and means for short-circuiting the second winding when suitable speed has been attained.

In testimony whereof, I have hereunto set my hand this the 14th day of October, 1924.

HANS WEICHSEL. [L. S.]